Figure 1:
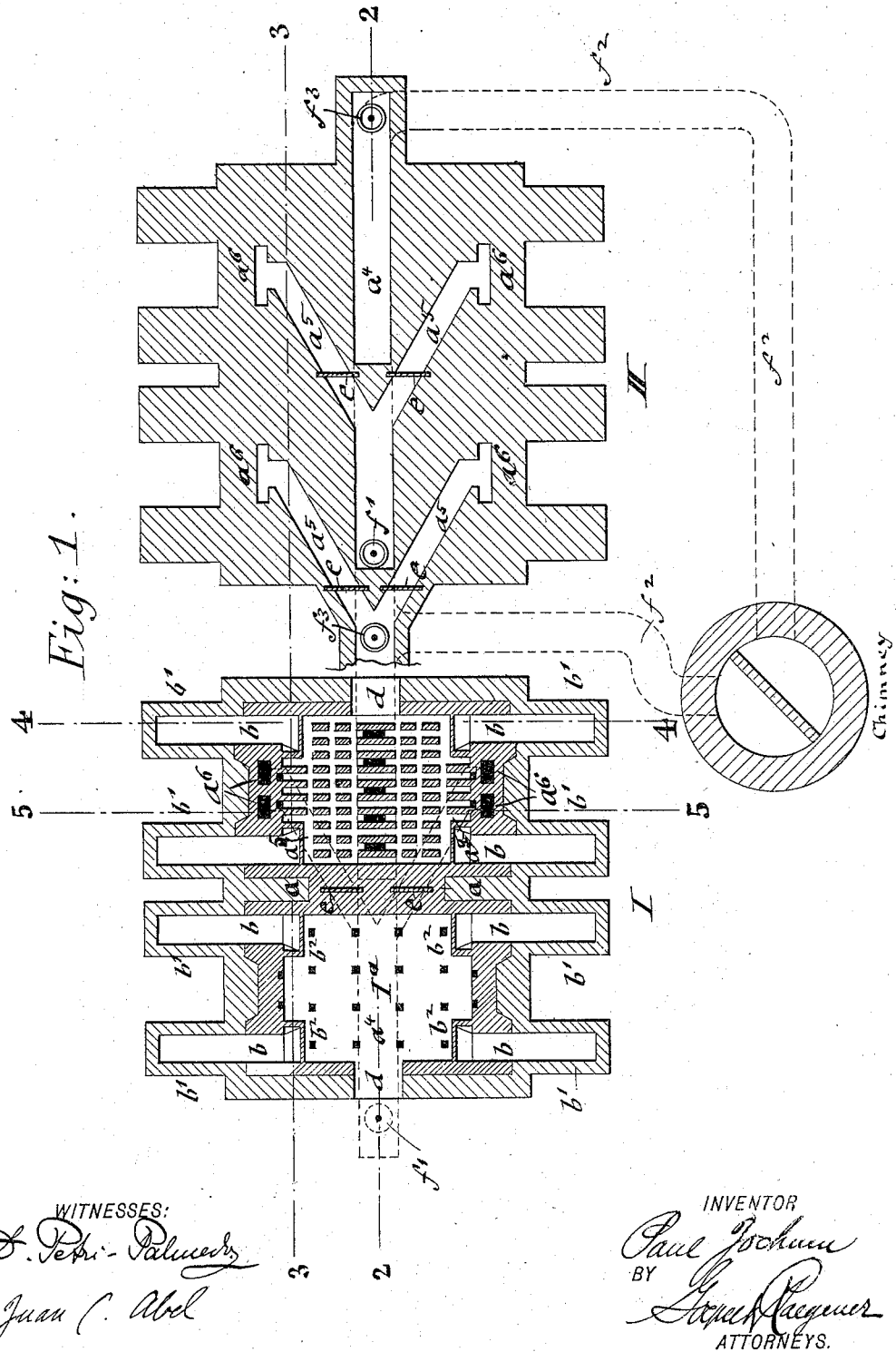

(No Model.) 3 Sheets—Sheet 1.

P. JOCHUM.
KILN.

No. 565,753. Patented Aug. 11, 1896.

WITNESSES:

INVENTOR
Paul Jochum
BY
ATTORNEYS.

(No Model.)  P. JOCHUM.  3 Sheets—Sheet 2.
KILN.
No. 565,753.  Patented Aug. 11, 1896.
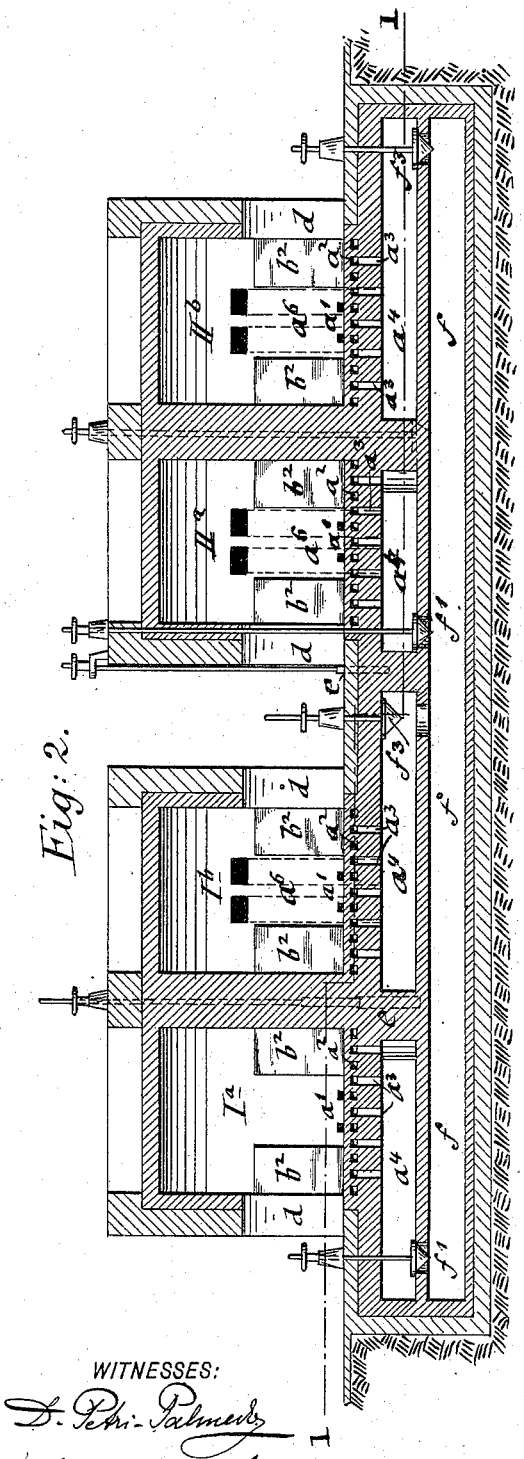
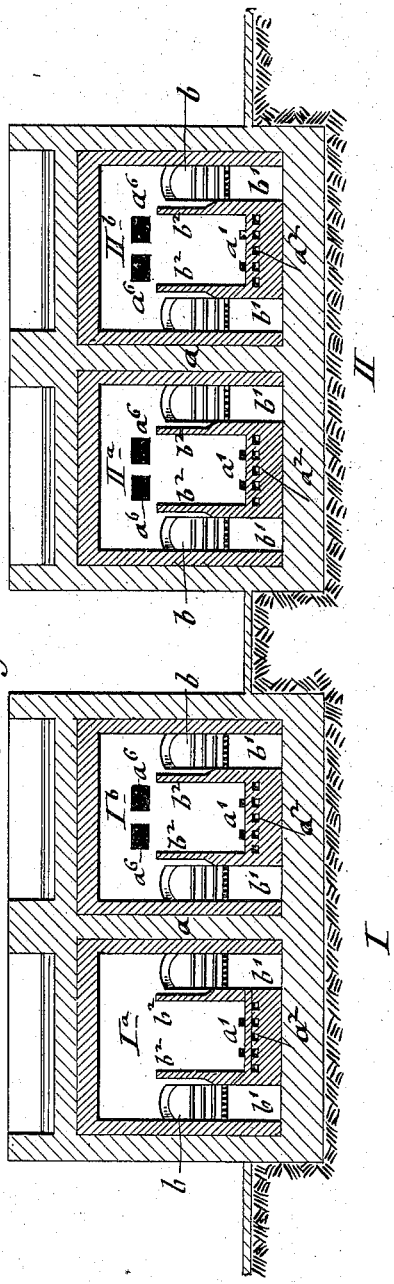
WITNESSES:  INVENTOR
Paul Jochum
BY
ATTORNEYS.

(No Model.)
P. JOCHUM.
KILN.
No. 565,753. Patented Aug. 11, 1896.
3 Sheets—Sheet 3.
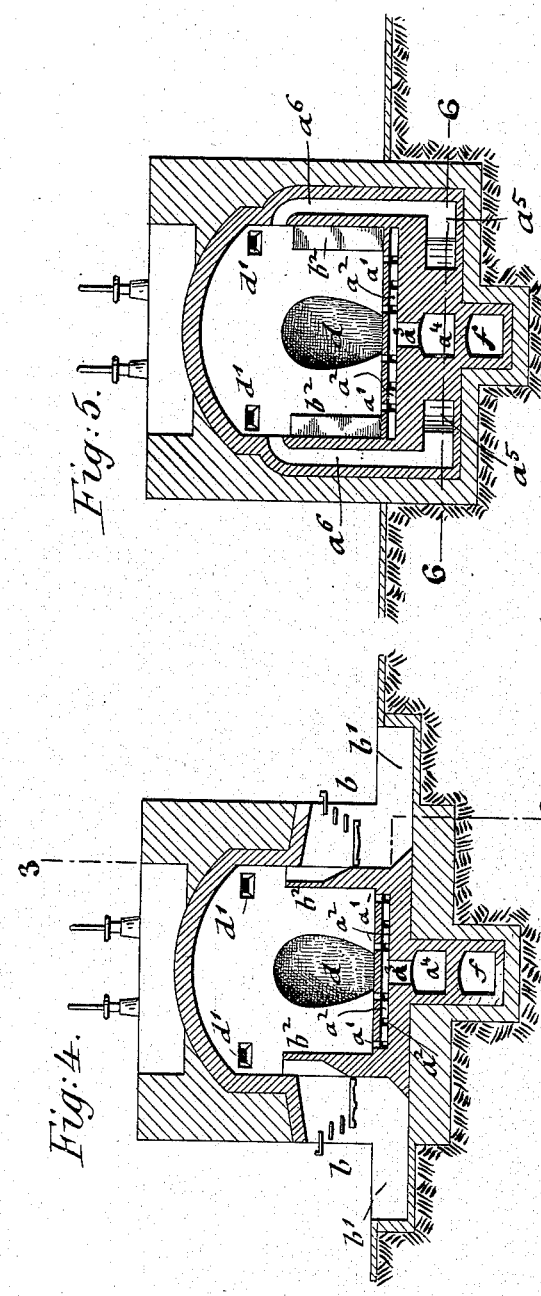
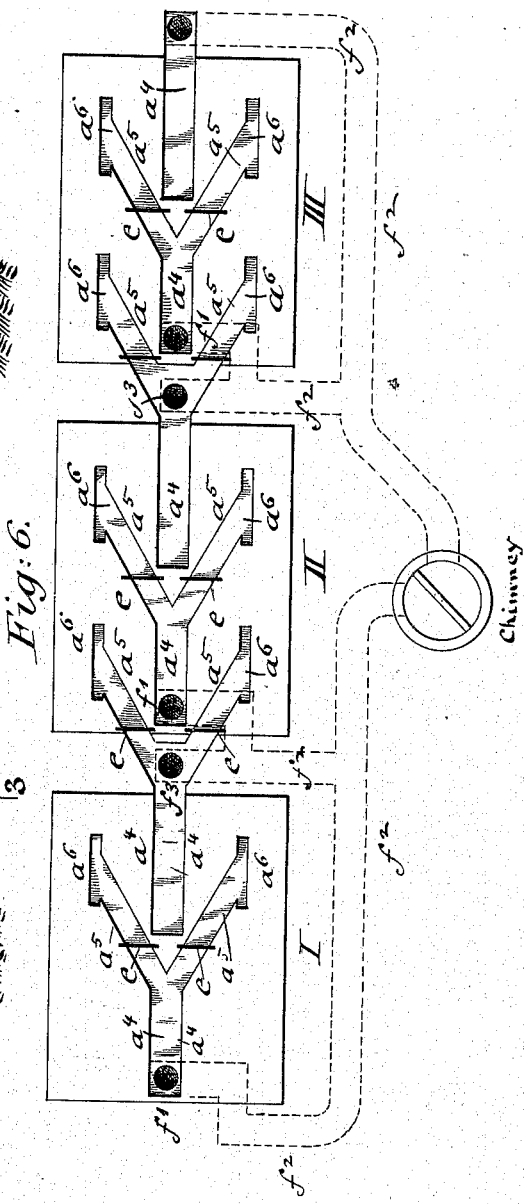
WITNESSES:
INVENTOR
Paul Jochum
BY
ATTORNEYS.

UNITED STATES PATENT OFFICE.

PAUL JOCHUM, OF OTTWEILER, GERMANY.

KILN.

SPECIFICATION forming part of Letters Patent No. 565,753, dated August 11, 1896.

Application filed September 24, 1894. Serial No. 523,915. (No model.)

*To all whom it may concern:*

Be it known that I, PAUL JOCHUM, a citizen of the German Empire, residing at Ottweiler, in the Kingdom of Prussia and Empire of Germany, have invented certain new and useful Improvements in Kilns, of which the following is a specification.

This invention relates to certain improvements in the brick-kiln for which Letters Patent were granted to me heretofore, No. 404,198, dated May 28, 1889, so that the kiln can be operated, either with direct or indirect firing, continuously or intermittently, as required, said kiln being composed of a series of double kilns, of which each individual kiln can be connected with another one of the series and each with the chimney, the flues connecting the different kilns of the series being arranged in a comparatively simple yet effective manner, so that the heat of one kiln can be drawn over into the next adjacent kiln, and so on, whereby not only the construction of the kiln is simplified, but the same also operated at a considerable saving in time and fuel.

The invention consists, first, of a double kiln provided with fireplaces, preferably two at each side, fire-walls at the inner ends of the fireplaces whereby the latter communicate with the combustion-chamber of the kilns, draft-openings in the floor of each combustion-chamber, lateral flues connecting said openings with a central longitudinal draft-flue below said floor, and V-shaped channels by which the central draft-flue is connected with vertical channels in the side walls of the next adjacent kiln.

The invention consists, secondly, of a kiln having a combustion-chamber, draft-openings in the floor of the same, lateral flues, a central longitudinal draft-flue communicating with said lateral flues, V-shaped branch flues connecting the central draft-flue with vertical flues in the side walls of the next adjacent kiln, a main smoke-flue below the central draft-flue of each kiln, branch flues leading from the main smoke-flues to the chimney, and valves at the points of intersection of the main smoke-flue with the branch flues, so as to establish the direct connection of the smoke-flue with each kiln with the chimney or with the smoke-flue of adjacent kilns.

The invention consists, further, of certain details of construction and combination of parts which will be fully described hereinafter, and finally pointed out in the claims.

In the accompanying drawings, Figure 1 represents a horizontal section of my improved kiln on line 1 1, Fig. 2. Fig. 2 is a vertical longitudinal section on line 2 2, Fig. 1. Fig. 3 is a longitudinal section on line 3 3, Figs. 1 and 4. Figs. 4 and 5 are vertical transverse sections, respectively, on lines 4 4 and 5 5, Fig. 1; and Fig. 6 is a horizontal section on line 6 6, Fig. 5.

Similar letters of reference indicate corresponding parts.

Each kiln is preferably constructed as a double kiln, a number of which are arranged in connection with each other. Each double kiln I II III, &c., is made of oblong shape and divided by a transverse wall $a$ of firebrick, each double kiln being provided with four or more fireplaces $b$ in its longer sides, according to the size of the kiln, each single kiln having two fireplaces on each side. Each fireplace is provided with a step-shaped inclined grate and a horizontal grate, to which grates the fuel is fed, each fireplace $b$ being provided with an ash-pit $b'$, through which a regulated quantity of air can be drawn in, so that the fireplace can be used as a generator for the fire-gases during the descending motion of the fuel over the step-shaped grate onto the horizontal grate. The inner end of each fireplace $b$ is connected by a vertical channel with the interior of the combustion-chamber of the kiln, said upright channel or flue being formed by a rectangular partition or fire-wall $b^2$, that projects into the combustion-chamber $I^a$ at each corner of the same, as shown at the left-hand side of Fig. 1. The fire-walls $b^2$ extend somewhat above one-half the height of the combustion-chamber, the fire-gases being conducted from the same along the arched top of the combustion-chamber and then drawn in downward direction over and around the bricks or other articles charged in the combustion-chamber. The fire-gases are then drawn through a number of draft-openings $a'$, arranged in the floor of the combustion-chamber and conducted by lateral channels $a^2$ from the same by a vertical flue $a^3$ into a central draft-flue $a^4$, that extends longitudinally below the combustion-chamber of the first kiln of each double kiln, and that is connected by diverging or V-shaped branch flues $a^5$ below the floor of the second kiln of each double kiln with vertical flues $a^6$ in the side walls of the second kiln, said vertical flues opening somewhat above the upper edge of the fire-walls into the second kiln, so that the hot products of combustion can be drawn from the first kiln into the second kiln and passed over the charge placed in the same.

Each kiln is provided in its end wall with an opening $d$, through which the kiln is charged in the usual manner, said opening being closed with a temporary wall of fire-bricks in the usual manner, an aperture being left in the closing-wall for observing the charge in the combustion-chamber, while at each side of the charging-opening additional apertures $d'$ $d'$ are left, by which the progress of the burning operation can be observed. These openings are shown in Figs. 4 and 5, and are inserted in the usual manner.

In the central partition-wall $a$ between the combustion-chambers of each double kiln are arranged vertically-guided slides or valves $e$, that are operated from the top of the kiln, and by which the connection of the central draft-flue of the first kiln of each double kiln with the V-shaped branch flues of the adjacent kiln is made. Below the central draft-flue $a^4$ of each double kiln a main smoke-flue $f$, which is connected with the end of the central draft-flue $a^4$ of each kiln by an auxiliary slide or cone valve $f'$, the main smoke-flue being further connected at points intermediately between two adjacent double kilns by branch smoke-flues $f^2$ and main slide or cone valves $f^3$ with the chimney, as shown in Fig. 1. The cone-valves $f'$ $f^3$ and the connection of the central draft-flues with the main smoke-flue $f$ are so arranged that each kiln can be connected at will directly with the main smoke-flue and the chimney, in which case, however, the sliding valves that are arranged in the V-shaped branch-flues have to be closed. It thus appears that each double kiln is provided in its main smoke-flue with two valves, an auxiliary valve and a main valve, the auxiliary valve being arranged at the end of the central draft-flue, while the main valve is located near the point of connection of the V-shaped branch flues with the central draft-flue. Special attention has to be given that no auxiliary valve be arranged in that portion of the central draft-flue which connects with the V-shaped branch flues that lead from one kiln to the next adjacent kiln, but that the auxiliary valve be always located at the beginning of the central draft-flue, as shown clearly in Fig. 6, in which the auxiliary valves are arranged at the ends of the central draft-flues of the first kilns of the first, second, and third double kilns, as indicated by cross-hatching, while the main valves have to be located near the point of connection of the branch flues with the central draft-flues, as shown in full black. The main smoke-flue $f'$ is connected at the points where the auxiliary as well as the main valves are located by branch smoke-flues $f^2$ with the chimney, as shown in dotted lines in Fig. 6.

Any number of double kilns may be arranged and connected in the manner shown in Fig. 6 and worked continuously, provided that they are grouped in the form of an oblong around the chimney. The continuous working can, however, be interrupted at any time and each double kiln operated intermittently for itself or in connection with any double kiln of the series.

My improved kiln is operated as follows: The charging of each kiln is accomplished in the well-known manner through the charging-opening in the end of the kiln, after which the opening is closed by a wall of fire-brick in the usual manner. The fires are then started in the fireplaces of kiln I$^a$ until the charge is heated up and gradually dried, which can be readily observed through the aperture in the closing-wall of the charging-opening. After the fires are started and the charge in the kiln is dried the fireplaces are supplied with a regular charge of fuel. During the drying of the charge in the kiln I$^a$ the fire-gases are conducted from the fireplaces to the interior of the combustion-chamber, then drawn in downward direction through the draft-openings in the floor of the same into the central draft-flue and toward the end of the same, where the auxiliary cone-valve is opened, so that the products of combustion can pass directly through the main and branch smoke-flues to the chimney. As soon as the charge in kiln I$^a$ is at red heat the fireplaces as well as the ash-pits of kiln I$^b$ are closed by suitable masonry, while the doors of the fireplaces are luted with fireproof cement, so that no air can enter through the same. The vertically-guided slides or valves in the V-shaped branch draft-flues are then opened, so that the fire-gases can pass from the central draft-flue through the V-shaped branch flues into the vertical flues of the adjacent kiln I$^b$ of the double kiln. The auxiliary valve is closed and the main valve in the main smoke-flue of kiln I$^b$ is then opened and the sliding valves located adjacent thereto in the V-shaped branch flues of the kiln II$^a$ of the next adjacent double kiln are closed. The products of combustion from the kiln I$^a$ are then drawn through the vertical channels in the side walls of kiln I$^b$ and emitted into the same, they being then drawn over the charge in kiln I$^b$, so as to give off the heat still contained in the fire-gases, which are then drawn through the draft-openings in the floor of the kiln I$^b$ into the center draft-flue of this kiln, and from the same through the main and branch smok-flues to the chimney. The charge in kiln I$^b$, being thus heated by the fire-gases obtained from the kiln I$^a$, is thereby quickly raised to dark-red heat. As soon as the charge in kiln I$^a$ is burned sufficiently the doors of the fireplaces of the kiln I$^b$ are opened and some of the bricks in the walls, by which the ash-pits of the fireplaces of kiln I$^b$ are closed, are removed. All the burning fuel in the fireplaces of kiln I$^a$ is then transferred to the fireplaces of kiln I$^b$, which are then charged in addition with new fuel. As the fireplaces of kiln I$^b$ are still closed, the air required for combustion cannot be drawn in through the fireplaces of kiln I$^b$, and the latter is therefore compelled to obtain all the air necessary for combustion from kiln I$^a$. The fireplaces of kiln I$^b$ are thus compelled to function in the nature of gas-generators, which they can do, owing to the combination of step-shaped and horizontal grates, and owing to the comparatively small quantity of air which is supplied to the fuel on said grates. As all the air necessary for combustion must be taken from kiln I$^a$, the air is heated by its passage over the hot charge in the same to white heat, and as soon as this highly-heated air enters into kiln I$^b$ and meets the gases supplied from the fireplaces of the latter the perfect combustion of the highly-heated air and fire-gases will take place, so that the charge in kiln I$^b$ will be burned in a considerably shorter time and with much less fuel than the charge that has been burned in kiln I$^a$.

When a series of double kilns are arranged, the double kiln II is connected with kiln I$^b$ of the first double kiln, so that the heat generated in the kiln I$^b$ can be utilized by transferring the same in the manner just described to kiln II$^a$ of the next double kiln, the fireplaces and ash-pits of the second double kiln being closed in the manner before described, while the closed ash-pits of the kiln I$^a$ of the first double kiln and the closing-wall of its charging-opening are removed. The main cone-valve located between the double kilns is then closed, and the auxiliary valve located near the charging-opening of kiln II$^a$ of the second double kiln is opened. The draft-flue of the left-hand kiln of each double kiln is provided with an auxiliary slide or cone valve, by which it can be connected independently of the main slide or cone valves of the right-hand kiln of each double kiln to the main smoke-flue as soon as the main smoke-flues of the latter kilns are closed, whereby the kilns can be used for direct or indirect firing and for regenerative firing, as the hot and finished charge of one kiln will heat up the air that is drawn over the same and that is then conducted into the next adjacent kiln and utilized thereby for the drying and burning of the charge in the same.

When a number of double kilns are arranged and connected as above described, the series of kilns can be worked continuously, while each double kiln can be cut off and used for itself intermittently, as required by the quantity of bricks or other articles to be burned.

The advantages of my kiln, as compared with the kiln shown in my prior patent referred to, are, first, greater simplicity of construction, whereby the expense of erecting the kiln is considerably reduced; second, a considerable saving in fuel, which is obtained by connecting one kiln with the next adjacent kiln in the manner described and utilizing the fireplaces of the second kiln as gas-generators; third, a saving in time, as the air required for combustion is heated in its passage over the hot and burned charge of the first kiln to such a degree that when mingled with the fire-gases of the second kiln a more complete combustion and a higher temperature are obtained.

Having thus described my invention, I claim as new and desire to secure by Letters Patent—

1. The combination, with a series of kilns, each having a transverse partition and combustion-chambers on opposite sides thereof, of fireplaces in the side walls of the combustion-chambers, draft-openings in the floor of each combustion-chamber, a central draft-flue located below the floor of each combustion-chamber and connected with said draft-openings, V-shaped branch draft-flues leading from the central draft-flue of one combustion-chamber toward the side walls of the adjacent combustion-chamber, slides or valves located in said branch draft-flues, and vertical flues located in the side walls of the adjacent combustion-chamber and connected with the branch draft-flues, said branch draft-flues and vertical flues conducting the air heated by passing over the charge in one combustion-chamber into the adjacent combustion-chamber, substantially as set forth.

2. The combination, with a series of kilns, each provided with a transverse partition-wall, and combustion-chambers on opposite sides thereof, of fireplaces in the side walls of each combustion-chamber, draft-openings in the floor of each combustion-chamber, a central draft-flue located below the floor of each combustion-chamber and connected with said draft-openings, V-shaped draft-flues leading from the central draft-flue of one combustion-chamber toward the side walls of the next adjacent combustion-chamber, slides or valves in said branch flues, vertical flues in said side walls, connected with said branch draft-flues, a main smoke-flue located below the central draft-flues of all the combustion-chambers, an auxiliary valve connecting the stem of one central draft-flue with the main flue, a main valve connecting the stem of the next central draft-flue at its point of connection with the V-shaped branch flues with the main smoke-flue, and branch smoke-flues connecting the main smoke-flue with the chimney below the auxiliary and main valves, so as to establish the connection of each central draft-flue either directly, or indirectly through the combustion-chambers, with the chimney, substantially as set forth.

In testimony that I claim the foregoing as my invention I have signed my name in presence of two subscribing witnesses.

PAUL JOCHUM.

Witnesses:
FRITZ SCHRÖDER,
M. NAGEL.